(12) United States Patent
Park

(10) Patent No.: US 9,704,404 B2
(45) Date of Patent: Jul. 11, 2017

(54) LANE DETECTION APPARATUS AND OPERATING METHOD FOR THE SAME

(71) Applicant: HYUNDAI MOBIS Co., Ltd., Yongin-si (KR)

(72) Inventor: Sang jun Park, Yongin-si (KR)

(73) Assignee: HYUNDAI MOBIS CO., LTD., Yongin-Si (KR)

( * ) Notice: Subject to any disclaimer, the term of this patent is extended or adjusted under 35 U.S.C. 154(b) by 58 days.

(21) Appl. No.: 14/833,093

(22) Filed: Aug. 22, 2015

(65) Prior Publication Data

US 2016/0055751 A1 Feb. 25, 2016

(30) Foreign Application Priority Data

Aug. 22, 2014 (KR) ........................ 10-2014-0109786

(51) Int. Cl.
*G06F 17/10* (2006.01)
*G06G 7/78* (2006.01)
*G08G 1/16* (2006.01)

(52) U.S. Cl.
CPC .................................. *G08G 1/167* (2013.01)

(58) Field of Classification Search
CPC . G06T 2207/20061; G06T 2207/30256; G06T 7/0085; G06T 7/0095
USPC ........................................................ 701/301
See application file for complete search history.

(56) References Cited

U.S. PATENT DOCUMENTS

| 4,970,653 | A | * | 11/1990 | Kenue | ...................... | G06T 7/00 |
| | | | | | | 348/116 |
| 5,351,044 | A | * | 9/1994 | Mathur | ................ | G05D 1/0246 |
| | | | | | | 340/436 |
| 5,832,138 | A | * | 11/1998 | Nakanishi | ............ | G06K 9/4633 |
| | | | | | | 382/199 |

(Continued)

*Primary Examiner* — Harry Oh
(74) *Attorney, Agent, or Firm* — Mayer Brown LLP; Hyunho Park

(57) ABSTRACT

Disclosed are a lane detection apparatus and an operating method for the same, and the operating method for the lane detection apparatus includes: detecting a plurality of edges in a driving image of a vehicle expressed by Cartesian coordinates; detecting a pattern of the plurality of edges; estimating a horizontal location of the vehicle in a driving lane based on the detected pattern; setting two regions of interest in the driving image based on the horizontal location; generating two Hough spaces corresponding two regions of interest, respectively, including a plurality of counting regions, and expressed by polar coordinates; calculating a polar coordinate value of each pixel included in the edge shown in each of two regions of interest among the plurality of edges by using Hough transform that transforms the Cartesian coordinates into the polar coordinates; accumulating the count of the counting region to which the polar coordinate value belongs, with respect to two respective Hough spaces; selecting a counting region having the highest count number among the plurality of counting regions with respect to two respective Hough spaces; transforming the counting region having the highest count number into two straight lines expressed by the Cartesian coordinates, with respect to two respective Hough spaces; and detecting two transformed straight lines as a left lane and a right lane of the driving lane.

9 Claims, 6 Drawing Sheets

(a)

(b)

(c)

(56) References Cited

U.S. PATENT DOCUMENTS

| | | | | |
|---|---|---|---|---|
| 6,111,993 | A * | 8/2000 | Matsunaga | G06T 7/0085 382/103 |
| 2007/0165909 | A1* | 7/2007 | Leleve | G05D 1/0246 382/104 |
| 2010/0238283 | A1* | 9/2010 | Kim | B60W 50/16 348/135 |
| 2011/0044503 | A1* | 2/2011 | Sato | G06T 7/0085 382/103 |
| 2013/0100286 | A1* | 4/2013 | Lao | G06K 9/00785 348/148 |
| 2013/0201358 | A1* | 8/2013 | Sun | G06K 9/3275 348/222.1 |
| 2014/0193096 | A1* | 7/2014 | Hasegawa | G06K 9/4633 382/281 |
| 2015/0281519 | A1* | 10/2015 | Tsugimura | H04N 1/4092 358/474 |

\* cited by examiner (a)

S1 → r = X1·cosΘ + Y1·sinΘ
S2 → r = X2·cosΘ + Y2·sinΘ

(b)

LANE DETECTION APPARATUS AND OPERATING METHOD FOR THE SAME

CROSS-REFERENCE TO RELATED APPLICATIONS

The present application claims priority to Korean Patent Application Number 10-2014-0109786 filed Aug. 22, 2014, the entire contents of which application is incorporated herein for all purposes by this reference.

TECHNICAL FIELD

The present invention relates to a lane detection apparatus and an operating method for the same, and more particularly, to an operating method for a lane detection apparatus which sets a region of interest for lane detection based on a horizontal location of a vehicle in a driving lane to easily detect a lane and rapidly warn a lane departure.

BACKGROUND

Safe driving and prevention of a traffic accident are most important in driving a vehicle and to this end, various auxiliary devices that perform a posture control of a vehicle, a functional control of vehicular constituent devices, and the like and safety devices such as a safety belt, an airbag, and the like are mounted on the vehicle.

In recent years, a black box has been installed in the vehicle and data transmitted from various sensors of the vehicle have been stored in the black box, and as a result, an accident cause of the vehicle could have been investigated by withdrawing the black box installed in the vehicle when an accident of the vehicle occurs.

Meanwhile, a lane departure warning system is a system that protects a driver from drowsy driving, careless driving, and an unexpected lane departure accident and assists a driver to perform safe driving and a dedicated camera is mounted on a front glass of the vehicle behind a room mirror to continuously monitor a situation of a road with a camera and automatically make a warning sound when the lane departure is predicted.

In recent years, when it is verified whether the vehicle departs from the lane through an image in the lane departure warning system, a research for increasing a processing speed has been in progress.

SUMMARY

The present invention has been made in an effort to provide an operating method for a lane detection apparatus which easily detects a lane and rapidly warns a lane departure.

An exemplary embodiment of the present invention provides an operating method for a lane detection apparatus, including: detecting a plurality of edges in a driving image of a vehicle expressed by Cartesian coordinates; detecting a pattern of the plurality of edges; estimating a horizontal location of the vehicle in a driving lane based on the detected pattern; setting two regions of interest in the driving image based on the horizontal location; generating two Hough spaces corresponding to two regions of interest, respectively, including a plurality of counting regions, and expressed by polar coordinates; calculating a polar coordinate value of each pixel included in the edge shown in each of two regions of interest among the plurality of edges by using Hough transform that transforms the Cartesian coordinates into the polar coordinates; accumulating the count of the counting region to which the polar coordinate value belongs, with respect to two respective Hough spaces; selecting a counting region having the highest count number is selected among the plurality of counting regions with respect to two respective Hough spaces; transforming the counting region having the highest count number into two straight lines expressed by the Cartesian coordinates, with respect to two respective Hough spaces; and detecting two transformed straight lines as a left lane and a right lane of the driving lane.

The detecting of the plurality of edges in the driving image of the vehicle may include receiving the driving image from a camera of the vehicle, transforming the driving image into a gray image, and detecting the plurality of edges based on brightness values of pixels included in the gray image.

In the detecting of the plurality of edges, pixels of a region in which a brightness change amount of a reference value or more in the gray image may be connected to detect the plurality of edges.

The horizontal location may be estimated as any one of a first location corresponding to the center of the driving lane, a second location corresponding to a left side of the driving lane, and a third location corresponding to a right side of the driving lane.

The region of interest may include a first region of interest positioned at a left side and a second region of interest positioned at a right side based on a central vertical axis of the driving image.

In the generating of the Hough space, each of a first Hough space corresponding to the first region of interest and a second Hough space corresponding to the second region of interest may be generated.

In the setting of the region of interest in the driving image, the size or location of the region of interest may be decided based on an installation angle and an image angle of the camera photographing the driving image.

The transforming of the counting region having the highest count number into the straight lines expressed by the Cartesian coordinates may be performed when the count number of the selected counting region is equal to or more than a predetermined reference value.

The method may further include: calculating a distance between the left lane and the right lane; determining whether the distance between the left lane and the right lane is within a predetermined reference range; and increasing the number of the counting regions included in two respective Hough spaces when it is determined that the distance between the left lane and the right lane deviates from the predetermined reference range.

The method may further include outputting a warning message when the length of at least any one of the left lane and the right lane rapidly decreases by a predetermined change amount or more.

According to at least any one exemplary embodiment of the present invention, a lane detection apparatus and an operating method for the same set a region of interest for lane detection based on a horizontal location of a vehicle in a driving lane to shorten a processing time required for lane detection as compared with the existing scheme.

With the increase in lane detection speed, a warning is more rapidly output in a lane departure to protect a driver from a collision accident, and the like.

The effects of the present invention are not limited to the aforementioned effects, and other effects, which are not mentioned above, will be apparent to those skilled in the art from the description included in the appended claims.

DETAILED DESCRIPTION

Figure 1:
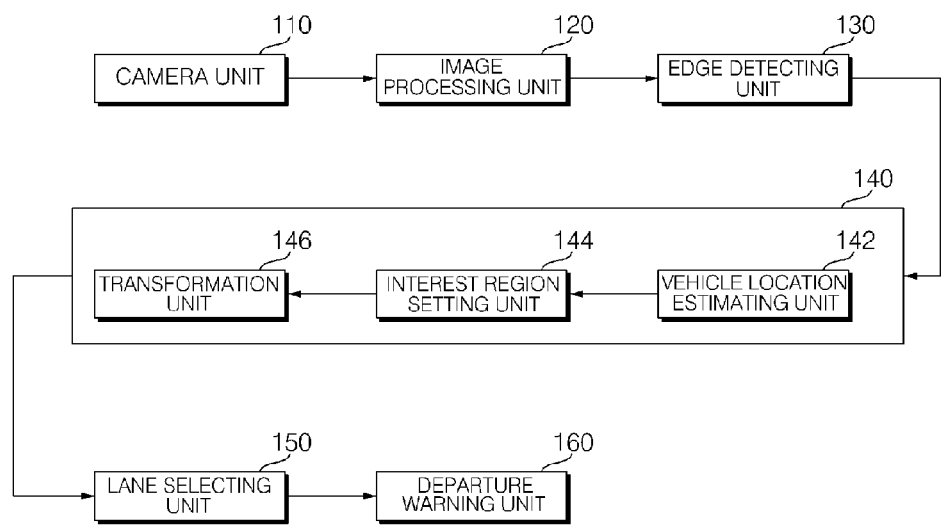
FIG. 1 is a block diagram of a lane detection apparatus according to the present invention.

Various advantages and features of the present invention and methods accomplishing thereof will become apparent from the following description of embodiments with reference to the accompanying drawings. However, the present invention is not limited to exemplary embodiments to be disclosed below, but various forms different from each other may be implemented. The exemplary embodiments are merely intended to make the disclosure of the present invention complete and to completely notify the person with ordinary skill in the art, to which the present invention belongs, of the scope of the invention, and the present invention is only defined by the scope of the claims. Like reference numerals indicate like elements throughout the specification.

If there is no other definition, all terms (including technical and scientific terms) used in the specification may be used as meanings which may be commonly appreciated by those skilled in the art. Further, terms defined in a dictionary which is generally used should not be ideally or excessively interpreted unless not clearly and particularly defined.

FIG. 1 is a block diagram of a lane detection apparatus according to the present invention.

Referring to FIG. 1, a lane detection apparatus may include a camera unit 110, an image processing unit 120, an edge detecting unit 130, a Hough transformation unit 140, a lane selecting unit 150, and a departure warning unit 160. For example, the lane detection apparatus may be a vehicular navigation apparatus including the camera unit 110 and is not limited thereto.

The camera unit 110 is provided in a vehicle to generate a driving image. For example, the camera unit 110 may include one or more cameras and one or more cameras are mounted on an upper center of a windshield of the vehicle to photograph a view in front of the vehicle and generate the driving image of the photographed front. However, this is exemplary and the camera unit 110 may photograph driving images of various directions including a rear side, a left side, a right side, and the like even in addition to the front side of the vehicle and the camera unit 110 is not limited thereto.

In this case, the driving image generated by the camera unit 110 may be a color image (e.g., RGB image). Further, the driving image may be expressed by a Cartesian coordinates. For example, the driving image may be expressed by a 2D plane coordinate system constituted by an X axis and a Y axis which are orthogonal to each other.

The image processing unit 120 may receive the driving image from the camera unit 110 and convert the received driving image into a gray image. Since pixels included in the gray image are expressed as brightness values, lane detection may be easier than the color image.

The image processing unit 120 may correct resolution, a color space, and the like or remove noise at the time of converting the driving image into the gray image and the image processing unit 120 is not limited thereto.

For example, when a shadow such as a guiderail, or the like overlaps with a part of a driving lane, it is difficult to detect the lane, and as a result, the image processing unit 120 corrects a light source to minimize a shadow influence. Further, when the driving image is the RGB image, the image processing unit 120 applies a light source correction algorithm to correct the RGB image and thereafter, convert the corrected RGB image into the gray image and the image processing unit 120 is not limited thereto.

The edge detecting unit 130 applies an edge detection algorithm to the gray image provided from the image processing unit 120 to detect a plurality of edges from the gray image.

For example, the edge detecting unit 130 may detect the plurality of edges from the gray image based on brightness values of a plurality of respective pixels included in the gray image. In detail, the edge detecting unit 130 connects pixels of a region in which a brightness change amount of a reference value or more in the gray image to detect the plurality of edges. Some of the plurality of edges detected by the edge detecting unit 130 may correspond to a left lane and a right lane constituting the driving lane of the vehicle.

Alternatively, the edge detecting unit 130 detects pixels having an illuminance value larger than a predetermined illuminance value among the plurality of pixels included in the gray image and connects the detected pixels to each other to detect the plurality of edges.

The edge detecting unit 130 may extract a vanishing point in the driving image or the gray image. The Hough transformation unit 140 may include a vehicle location estimating unit 142, an interest region setting unit 144, and a transformation unit 146.

The vehicle location estimating unit 142 estimates a horizontal location of the vehicle in the driving path where the vehicle is driven. The vehicle location estimating unit 142 may detect patterns of the plurality of edges detected by the edge detecting unit 130 and estimate the horizontal location of the vehicle in the driving path based on the detected patterns. For example, the vehicle location estimating unit 142 may detect whether the plurality of edges form a symmetric pattern based on a central vertical axis, whether the plurality of edges form a pattern in which the plurality of edges concentrate on a left side based on the central vertical axis, or whether the plurality of edges form a pattern in which the plurality of edges concentrate on a right side based on the central vertical axis.

Herein, the horizontal location means a location where the vehicle is driven between a left lane and a right lane. For example, the horizontal location of the vehicle may be estimated as any one of a first location corresponding to the center of the driving lane, a second location corresponding to a left side of the driving lane, and a third location corresponding to a right side of the driving lane.

Alternatively, the vehicle location estimating unit 142 may calculate a vehicle location in the driving lane based on a vanishing point extracted from the driving image or the gray image and a horizontal axis passing through the vanishing point. For example, the vehicle location estimating unit 142 may detect a point where the most plural edges cross each other as the vanishing point.

The interest region setting unit 144 sets a region of interest in the driving image. Some of the plurality of edges detected by the edge detecting unit 130 may be shown in the interest area. In this case, the interest region setting unit 144 may set two regions of interest in the driving image.

In detail, the interest region setting unit 144 may set two regions of interest in the driving image based on the horizontal location estimated by the vehicle location estimating unit 142. In this case, one of two regions of interest may be a first region of interest positioned at the left side based on the central vertical axis of the driving image and the other one may be a second region of interest positioned at the right side based on the central vertical axis of the driving image.

In this case, the interest region setting unit 144 may control locations of the first and second regions of interest based on a location of the vanishing point extracted by the vehicle location estimating unit 142. For example, when the vanishing point is positioned on the central vertical axis of the driving image, the interest region setting unit 144 may set the locations of the first and second regions of interest bilaterally symmetrically based on the central vertical axis of the driving image. As another example, when the vanishing point is positioned at the left side based on the central vertical axis of the driving image, the locations of the first and second regions of interest may be moved to the left side by a predetermined distance as compared with the case in which the vanishing point is positioned on the central vertical axis of the driving image. As another example, when the vanishing point is positioned at the right side based on the central vertical axis of the driving image, the locations of the first and second regions of interest may be moved to the right side by a predetermined distance as compared with the case in which the vanishing point is positioned on the central vertical axis of the driving image.

In this case, the first region of interest and the second region of interest may be set not to overlap with each other. However, this is exemplary and the interest region setting unit 144 may set three or more regions of interest in the driving image.

Meanwhile, the interest region setting unit 144 may decide the size or location of the region of interest based on an installation angle or an image angle of the camera unit 110. For example, as the image angle of the camera unit 110 increases, the interest region setting unit 144 may extend the size of the region of interest.

Hereinafter, it is assumed that the interest region setting unit 144 sets the first and second regions of interest for easy description.

The transformation unit 146 generates a Hough space corresponding to the region of interest. In detail, the transformation unit 146 may generate a first Hough space corresponding to the first region of interest and generate a second Hough space corresponding to the second region of interest. In this case, each Hough space may be expressed by polar coordinates and may include a plurality of counting regions. Each counting region may correspond to any one coordinate value of the polar coordinates or a set of coordinate values within a predetermined interval.

In the related art, the Hough space corresponding to the entirety of the driving image is generated, but in the present invention, a Hough space corresponding to the region of interest which is a part of the driving image is generated. As a result, as described below, a processing time required for the lane detection may be shortened and a warning message may be output to the driver more rapidly as long as the shortened time in the lane departure.

The transformation unit 146 calculates a polar coordinate value of each pixel included in the edge shown in each of the first and second regions of interest among the plurality of edges by using Hough transform that transforms a Cartesian coordinates into the polar coordinates. That is, each of the pixels included in the edge is expressed by one point in the Cartesian coordinates, while each pixel is expressed by a curve having a plurality of polar coordinate values in the polar coordinates.

The transformation unit 146 accumulates a count of counting regions to which the plurality of polar coordinate values belong with respect to each of the first Hough space and the second Hough space. For example, as a result of the Hough transform, in the case where a plurality of curves are drawn in the polar coordinates, when most plural curves cross each other in any one coordinate value, the count of the counting region to which the corresponding coordinate value belongs is larger than that of another counting region. An actual lane has a larger brightness value than other parts of a road and the actual lane corresponds to some of the plurality of edges detected by the edge detecting unit 130. Therefore, there is a high possibility that a counting region having a higher count will show the actual lane.

The lane selecting unit 150 selects a counting region having a highest count number among the plurality of counting regions with respect to each of the first Hough space and the second Hough space. As a result, any one counting region among the plurality of counting regions included in the first Hough space is selected and any one counting region among the plurality of counting regions included in the second Hough space is selected.

Next, the lane selecting unit 150 transforms the counting region selected in the first Hough space into one straight line expressed by the Cartesian coordinates and transforms the counting region selected in the second Hough space into another straight line expressed by the Cartesian coordinates.

In this case, the lane selecting unit 150 may compare the count number of the counting region selected for each Hough space with a predetermined reference value. As a comparison result, only when the count number of the counting region selected for each Hough space is equal to or more than the predetermined reference value, the corresponding counting region may be transformed into the straight line expressed by the Cartesian coordinates. The reason is that reliability to determine the counting region as the actual lane may not be secured when the count number of the counting region selected for each Hough space is less than the predetermined reference value.

Subsequently, the lane selecting unit 150 may detect the straight line transformed from the first Hough space as a left lane of the driving lane and the straight line transformed from the second Hough space as a right lane of the driving lane.

The lane selecting unit 150 may calculate a distance between the detected left lane and the detected right lane. Next, the lane selecting unit 150 may determine whether the distance between the left lane and the right lane is within a predetermined reference range. For example, assuming that the reference range is set to a value which is 0.9 to 1.1 times larger than a width of the lane defined by a regulation, when it is determined that the distance between the left lane and the right lane recognized by the lane selecting unit 150 deviates from the reference range, the transformation unit 146 may increase each of the number of counting regions included in the first Hough space and the number of counting regions included in the second Hough space by a predetermined number. Since that the distance between the detected left lane and right lane deviates from the reference range means a state in which an edge which does not correspond to the actual lane is detected as the left lane and the right lane, the number of counting regions included in the Hough space is increased to make the actual lane be included in the increased counting regions.

When the length of at least one of the left lane and the right lane selected by the lane selecting unit 150 is rapidly shorter by a predetermined change amount, the departure warning unit 160 may generate a control signal to output the warning message through a display or a speaker of the vehicle. The display of the vehicle may display the warning message onto a screen at the time of receiving the control signal from the warning unit 160. The speaker of the vehicle may display the warning message as a sound at the time of receiving the control signal from the warning unit 160.

Figure 2:
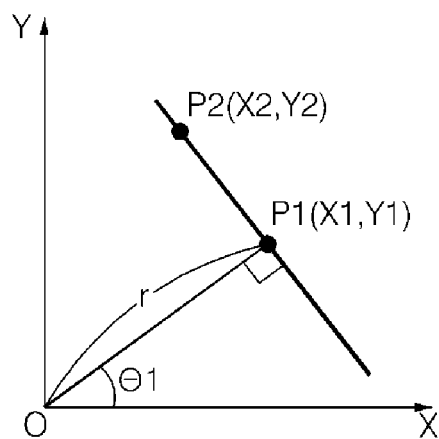
FIG. 2 illustrates a concept of Hough transform according to an exemplary embodiment of the present invention.
Figure 2:
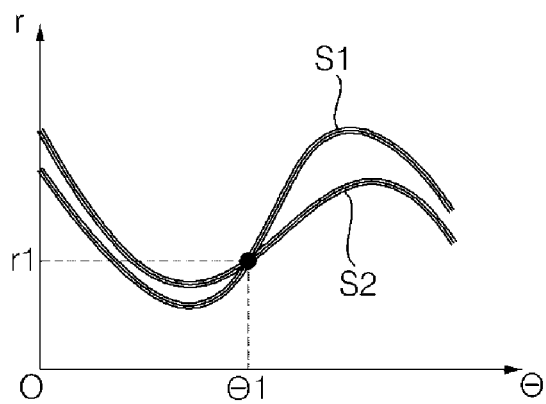

FIG. 2 illustrates a concept of Hough transform according to an exemplary embodiment of the present invention.

First, the Hough transform as a concept used in a computer vision may mean a technique for detecting a distinctive part (e.g., straight line) in a predetermined image.

For example, the transformation unit 146 may transform Cartesian coordinates into polar coordinates by using the Hough transform. Further, the Hough transform may be used to detect a most superior straight line (e.g., a thickest straight line, or the like) among a plurality of straight lines expressed in the Cartesian coordinates. Referring to FIG. 2, one straight line that passes through both two points P1(X1, Y1) and P2(X2, Y2) that exist in the Cartesian coordinates may be expressed as one point in the polar coordinates. That is, any one straight line on the Cartesian coordinates may be expressed as one point (r1, θ1) fixed on the polar coordinates. As illustrated in FIG. 2, r1 may represent a distance up to point P1(X1, Y1) from an origin point and θ1 may represent an angle ∠XOP1 of point P1(X1, Y1) for the origin point.

In detail, since numerous straight lines pass through one point P1(X1, Y1) in the Cartesian coordinates constituted by the X and Y axes which are orthogonal to each other, one point P1(X1, Y1) in the Cartesian coordinates may be expressed by one sine curve S1 in the polar coordinates.

Numerous straight lines that pass through pint P2 (X2, X2) different from one point P1(X1, Y1) in the Cartesian coordinates may be expressed by the other sine curve S2 in the polar coordinates.

A coordinate value of a cross point of two curves S1 and S2 in the polar coordinates exists in (r1, θ1). That is, the count number of a counting region to which one point (r1, θ1) on two curves S1 and S2 belongs is larger than that of another counting region.

That is, a straight line that passes through both of two different points P1(X1, Y1) and P2(X2, X2) in the Cartesian coordinates may be expressed by one point expressed by (r1, θ1) in the polar coordinates.

Therefore, when one point (r1, θ1) of the polar coordinates is inversely transformed, one straight line of the Cartesian coordinates may be acquired and the acquired straight line may be detected as the actual lane.

Figure 3:
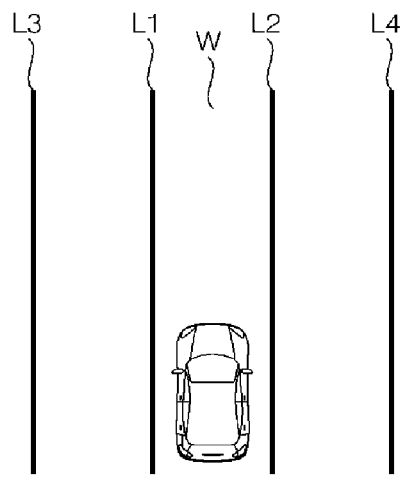
FIGS. 3 to 5 illustrate one example of a Hough space generated based on a horizontal location of a vehicle in a driving lane.
Figure 3:
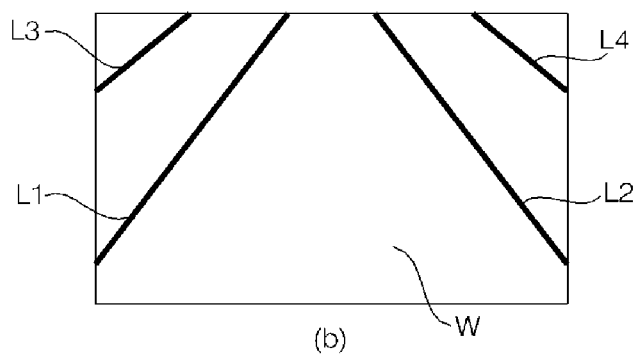
Figure 3:
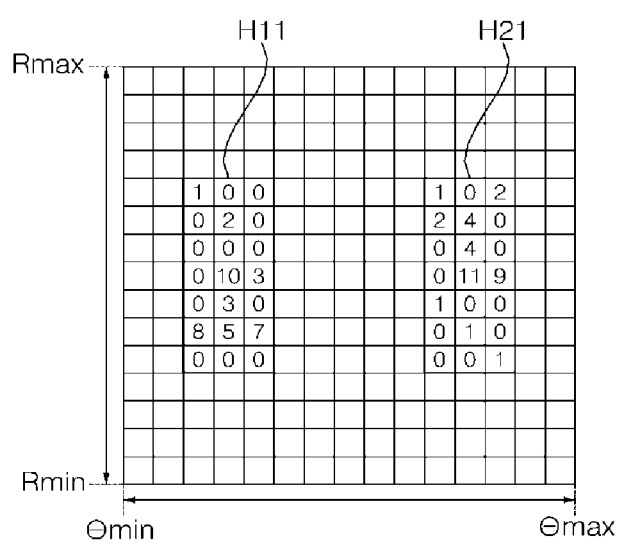
Figure 4:
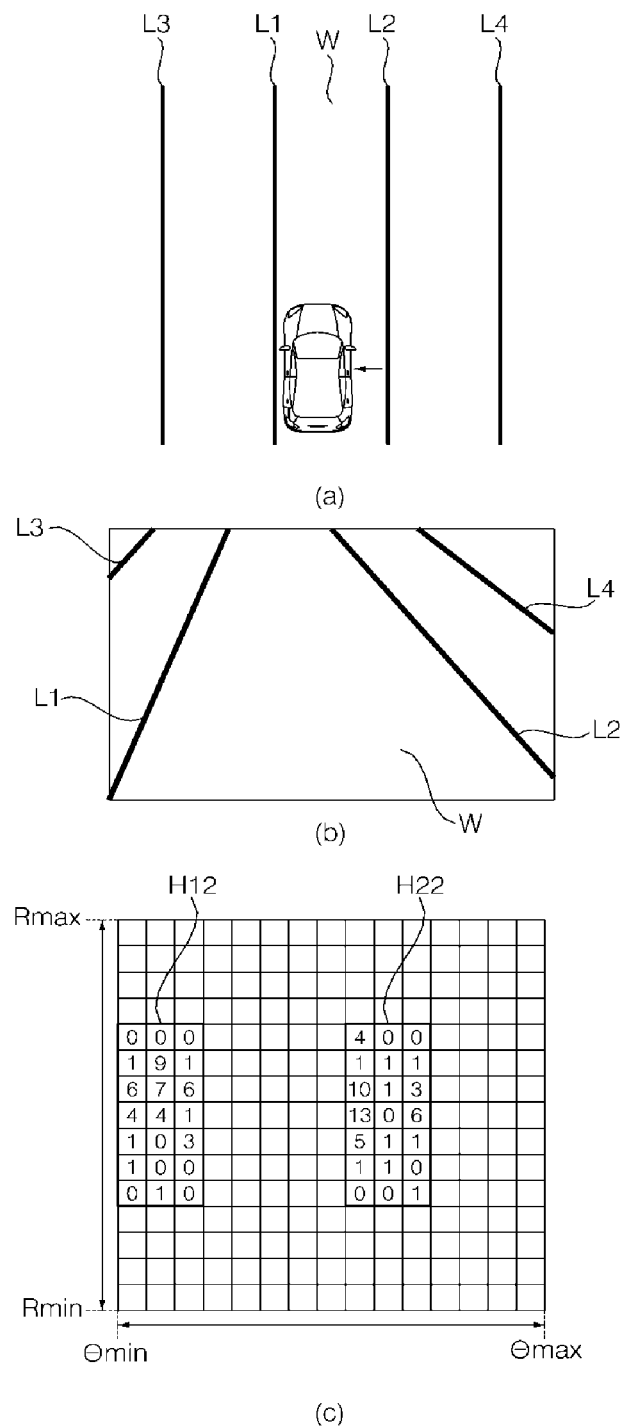
Figure 5:
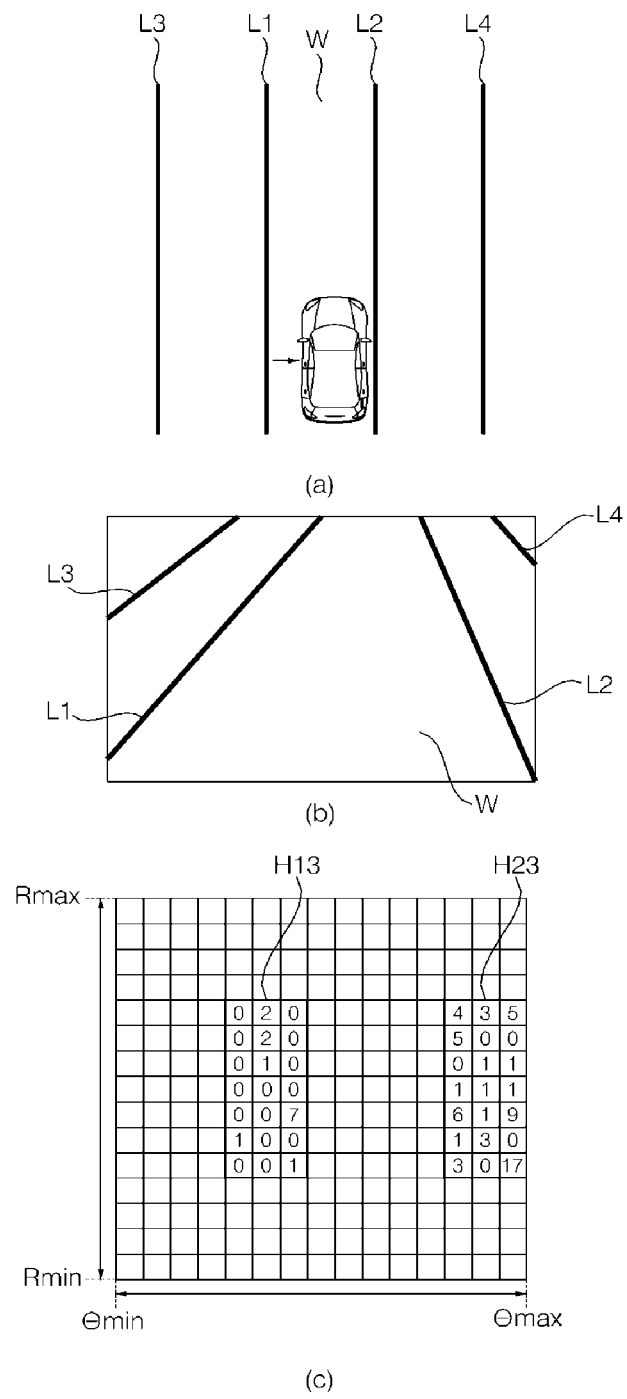

FIGS. 3 to 5 illustrate one example of a Hough space generated based on a horizontal location of a vehicle in a driving lane. In detail, FIGS. 3 to 5 propose a method that shortens a time required for the lane detection by controlling the location or size of the Hough space based on the horizontal location of the vehicle in the driving lane.

The Hough transformation unit 140 may partition each of the first Hough space and the second Hough space corresponding to the polar coordinates into a plurality of counting regions. In this case, the Hough transformation unit 140 accumulates the count number of the counting region through which the sine curve corresponding to any one point of the Cartesian coordinates passes, among the plurality of counting regions. That is, there may be higher possibility that a subordinate region in which the accumulated count number is higher will correspond to the driving lane than another subordinate region. For example, the count number of the counting region to which one point corresponding to the cross point of two curves belongs in the polar coordinates becomes 2.

As a result, the Hough transformation unit 140 may deduce a straight line corresponding to the actual lane based on two edges having a most approximate feature to the actual lane among the plurality of edges detected by the edge detecting unit 130 and detect the deduced lane as the left lane and the right lane constituting the driving lane.

In general, as the size of the entire driving image increases, the size of the Hough space also proportionally increases. However, when the size of the Hough space increases, a range in which the count number needs to be accumulated also increases. Further, when the plurality of counting regions are arranged in a descending order which is an order in which the count number is higher, a calculation amount required therefor also increases. The present invention proposes a method that generates only the Hough space corresponding to the region of interest to reduce a calculation amount required in detecting the lane, thereby improving the lane detection speed.

In the exemplary embodiment of the present invention, it is assumed that each of the first Hough space and the second Hough space is configured to have sizes within a predetermined angle range [θmin, θmax] and a predetermined distance range [Rmin, Rmax]. Herein, θmin represents a predetermined minimum angle for detecting the straight line, θmax represents a predetermined maximum angle for detecting the straight line, Rmin represents a predetermined minimum angle for detecting the straight line, and Rmax represents a predetermined maximum angle for detecting the straight line. In this case, the Hough transformation unit 140 may set the angle range [θmin, θmax] and the distance range [Rmin, Rmax] to be proportional to the entire size of the driving image.

Hereinafter, it is assumed that an intermediate value of θmin and θmax is 0°. In this case, a counting region included between the intermediate value of θmin and θmax and θmin is used to detect the left lane and a counting region included between the intermediate value of θmin and θmax and θmax is used to detect the right lane.

First, FIG. 3A illustrates a case in which the horizontal location of the vehicle in a driving lane W is the first location corresponding to the center of the driving lane W. That is, FIG. 3A shows a situation in which a center line of the vehicle and a center line of the driving lane W coincide with each other. In detail, a left lane L1 exists at the left side of the driving lane W and a right lane L2 exists at the right side of the driving lane W. Further, another lane L3 exists at the left side of the left lane L1 and another lane L4 exists at the right side of the right lane L2.

In this case, the edges shown in the driving image generated by the camera unit 110 may have a pattern illustrated in FIG. 3B. That is, the plurality of edges has a pattern in which the edges are symmetric to each other based on the central vertical axis of the driving image.

When the horizontal location of the vehicle in the driving lane W is the first location, the interest region setting unit 144 sets the first region of interest at the left side and the second region of interest at the right side based on the central vertical axis of the driving image. In this case, the first region of interest and the second region of interest may be symmetric to each other based on the central vertical axis of the driving image.

Therefore, as illustrated in FIG. 3C, a first Hough space H11 corresponding to the first region of interest and the second Hough space H21 corresponding to the second region of interest may also be symmetric to each other based on the central vertical axis of the entire Hough space.

The lane selecting unit 150 selects a counting region having 10 which is the highest count number among counting regions having a 7×3 form included in the first Hough space H11 illustrated in FIG. 3C and selects a counting region having 11 which is the highest count number among counting regions having the 7×3 form included in the second Hough space H21. Next, the lane selecting unit 150 transforms the counting region selected in the first Hough space H11 into one straight line expressed by the Cartesian coordinates to detect the left lane and transforms the counting region selected in the second Hough space H12 into one straight line expressed by the Cartesian coordinates to detect the right lane.

As illustrated in FIG. 3C, since the lane detection apparatus according to the exemplary embodiment of the present invention performs the lane detection only with respect to the first Hough space H11 and the second Hough space H21, not the entire Hough space, the lane detection speed is improved.

Next, FIG. 4A illustrates a case in which the horizontal location of the vehicle in the driving lane W is the second location corresponding to the left side of the driving lane. That is, FIG. 4A shows a situation in which the vehicle is driven in the state where the center line of the vehicle is positioned closer to the left lane L1 than the right lane L2. In detail, the left lane L1 exists at the left side of the driving lane W and the right lane L2 exists at the right side of the driving lane W. Further, another lane L3 exists at the left side of the left lane L1 and another lane L4 exists at the right side of the right lane L2. The horizontal location illustrated in FIG. 4A may be estimated when the vehicle approaches the left lane L1 from the center of the driving lane W.

In this case, the edges shown in the driving image generated by the camera unit 110 may have a pattern illustrated in FIG. 4B. In detail, the plurality of edges have a pattern in which the edges are asymmetric to each other based on the central vertical axis of the driving image and concentrate on the left side. That is, the edges may have a pattern in which a slope of the left lane L1 is shown to be relatively steeper than that of the right lane L2.

When the horizontal location of the vehicle in the driving lane W is the second location, the interest region setting unit 144 sets the first region of interest at the left side and the second region of interest at the right side based on the central vertical axis of the driving image. In this case, the first region of interest and the second region of interest are asymmetric to each other based on the central vertical axis of the driving image and may be set to a location where the first and second regions of interest move to the left side by a predetermined distance as compared with the case in which the horizontal location is the first location.

Therefore, as illustrated in FIG. 4C, a first Hough space H12 corresponding to the first region of interest and the second Hough space H22 corresponding to the second region of interest may also be asymmetric to each other based on the central vertical axis of the entire Hough space and may move to the left side by a predetermined interval as compared with the case in which the horizontal location is the first location.

That is, referring to FIG. 4B, since a pattern of a left region of the driving image in which the left lane L1 is shown is steeper than the pattern illustrated in FIG. 3B, the Hough transformation unit 140 may generate the first Hough space H12 at a relatively closer location from θmin. Further, since a pattern of a right region of the driving image in which the right lane L2 is shown is gentler than the pattern illustrated in FIG. 3B, the Hough transformation unit 140 may generate the second Hough space H23 at a relatively farther location from θmax.

In FIG. 4C, it is illustrated that a distance range to which the first Hough space H12 and the second Hough space H12 belong is the same as the distance range to which the first Hough space H11 and the second Hough space H21 belong, which is illustrated in FIG. 3C, but is not limited thereto. For example, when the horizontal location of the vehicle is the second location, the vehicle is closer to the left lane L1, while farther from the right lane L2 as compared with the case where the horizontal location is the first location, and as a result, the Hough transformation unit 140 may generate the first Hough space H12 at a relatively closer location from Rmin than the first Hough space H11 and the second Hough space H22 at a relatively closer location from Rmax than the second Hough space H21.

The lane selecting unit 150 selects a counting region having 9 which is the highest count number among counting regions having the 7×3 form included in the first Hough space H12 illustrated in FIG. 4C and selects a counting region having 13 which is the highest count number among counting regions having the 7×3 form included in the second Hough space H22. Next, the lane selecting unit 150 transforms the counting region selected in the first Hough space H12 into one straight line expressed by the Cartesian coordinates to detect the left lane and transforms the counting region selected in the second Hough space H22 into one straight line expressed by the Cartesian coordinates to detect the right lane.

As illustrated in FIG. 4C, since the lane detection apparatus according to the exemplary embodiment of the present invention performs the lane detection only with respect to the first Hough space H12 and the second Hough space H22, not the entire Hough space, the lane detection speed is improved.

Next, FIG. 5A illustrates a case in which the horizontal location of the vehicle in the driving lane W is the third location corresponding to the left side of the driving lane. In detail, the left lane L1 exists at the left side of the driving lane W and the right lane L2 exists at the right side of the driving lane W. Further, another lane L3 exists at the left side of the left lane L1 and another lane L4 exists at the right side of the right lane L2. The horizontal location illustrated in FIG. 5A may be estimated when the vehicle approaches the right lane L2 from the center of the driving lane W.

In this case, the edges shown in the driving image generated by the camera unit 110 may have a pattern illustrated in FIG. 5B. In detail, the plurality of edges have a pattern in which the edges are asymmetric to each other based on the central vertical axis of the driving image and concentrate on the right side. That is, the edges may have a pattern in which the slope of the right lane L2 is shown to be relatively steeper than that of the left lane L1.

When the horizontal location of the vehicle in the driving lane W is the third location, the interest region setting unit 144 sets the first region of interest at the left side and the second region of interest at the right side based on the central vertical axis of the driving image. In this case, the first region of interest and the second region of interest are asymmetric to each other based on the central vertical axis of the driving image and may be set to a location where the first and second regions of interest move to the right side by a predetermined distance as compared with the case in which the horizontal location is the first location.

Therefore, as illustrated in FIG. 5C, a first Hough space H13 corresponding to the first region of interest and a second Hough space H23 corresponding to the second region of interest may also be asymmetric to each other based on the central vertical axis of the entire Hough space and may move to the right side by a predetermined interval as compared with the case in which the horizontal location is the first location.

That is, referring to FIG. 5B, since a pattern of the left region of the driving image in which the left lane L1 is more gentle than the pattern illustrated in FIG. 3B, the Hough transformation unit 140 may generate the first Hough space H13 at a relatively farther location from θmin. Further, since a pattern of the right region of the driving image in which the right lane L2 is steeper than the pattern illustrated in FIG. 3B, the Hough transformation unit 140 may generate the second Hough space H23 at a relatively closer location from θmax.

In FIG. 5C, it is illustrated that a distance range to which the first Hough space H13 and the second Hough space H23 belong is the same as the distance range to which the first Hough space H11 and the second Hough space H21 belong, which is illustrated in FIG. 3C, but is not limited thereto. For example, when the horizontal location of the vehicle is the third location, the vehicle is farther from the left lane L1, while closer to the right lane L2 as compared with the case where the horizontal location is the first location, and as a result, the Hough transformation unit 140 may generate the first Hough space H13 at a relatively closer location from Rmax than the first Hough space H11 and the second Hough space H23 at a relatively closer location from Rmin than the second Hough space H21.

The lane selecting unit 150 selects a counting region having 7 which is the highest count number among counting regions having the 7×3 form included in the first Hough space H13 illustrated in FIG. 5C and selects a counting region having 17 which is the highest count number among counting regions having the 7×3 form included in the second Hough space H23. Next, the lane selecting unit 150 transforms the counting region selected in the first Hough space H13 into one straight line expressed by the Cartesian coordinates to detect the left lane and transforms the counting region selected in the second Hough space H23 into one straight line expressed by the Cartesian coordinates to detect the right lane.

As illustrated in FIG. 5C, since the lane detection apparatus according to the exemplary embodiment of the present invention performs the lane detection only with respect to the first Hough space H13 and the second Hough space H23, not the entire Hough space, the lane detection speed is improved.

Meanwhile, in FIGS. 3 to 5, it is illustrated that the number of all of the counting regions included in each of the first Hough space and the second Hough space is 21 having the 7×3 form, but is not limited thereto.

For example, 12 counting regions having a 6×2 form may be provided.

As another example, the number and an arrangement form of the counting regions included in the first Hough space may be set to be different from the number and the arrangement form of the counting regions included in the second Hough space. In detail, referring to FIG. 4B, when the horizontal location is the second location, the left lane L1 is shown to be closer and the right lane L2 may be shown to be farther in the driving image as compared with the case in which the horizontal location is the first location, and as a result, the number of the counting regions included in the first Hough space may decrease and the number of the counting regions included in the second Hough space may increase.

When a predetermined time elapses or the lane detection enters a stable state after the Hough transformation unit 140 performs the lane detection with respect to the entire Hough space for a predetermined time from starting the lane detection, the Hough transformation unit 140 may perform the lane detection only with respect to the first Hough space and the second Hough space and the present invention is not limited thereto.

The Hough spaces in FIGS. 3 to 5 may vary depending on detailed situations such as a driving environment, and the like. In addition, the first Hough space and the second Hough space illustrated in FIGS. 3 to 5 may be changed through image DB based value analysis. For example, an angular interval and a distance interval between the counting regions included in each Hough space may be 1° and 1 pixel, respectively.

Of course, the Hough transformation unit 140 may vary the number of the counting regions included in the first Hough space and the second Hough space or vary the size of the counting region depending on the driving environment (e.g., daytime or night time). For example, the Hough transformation unit 140 extends the size of the counting region at daytime rather than at night time to decrease the number of subordinate regions included in the Hough space.

Since the range of the counting region in which the count is accumulated in the Hough space may be set depending on the driving situation (e.g., horizontal location) of the vehicle, the technique proposed by the present invention may increase the lane detection speed while securing lane detection rate of a predetermined level or more.

When the vehicle overlaps with the left lane or right lane selected by the lane selecting unit 150, the departure warning unit 160 may give an alarm so as for the driver to detect the overlapping.

Figure 6:
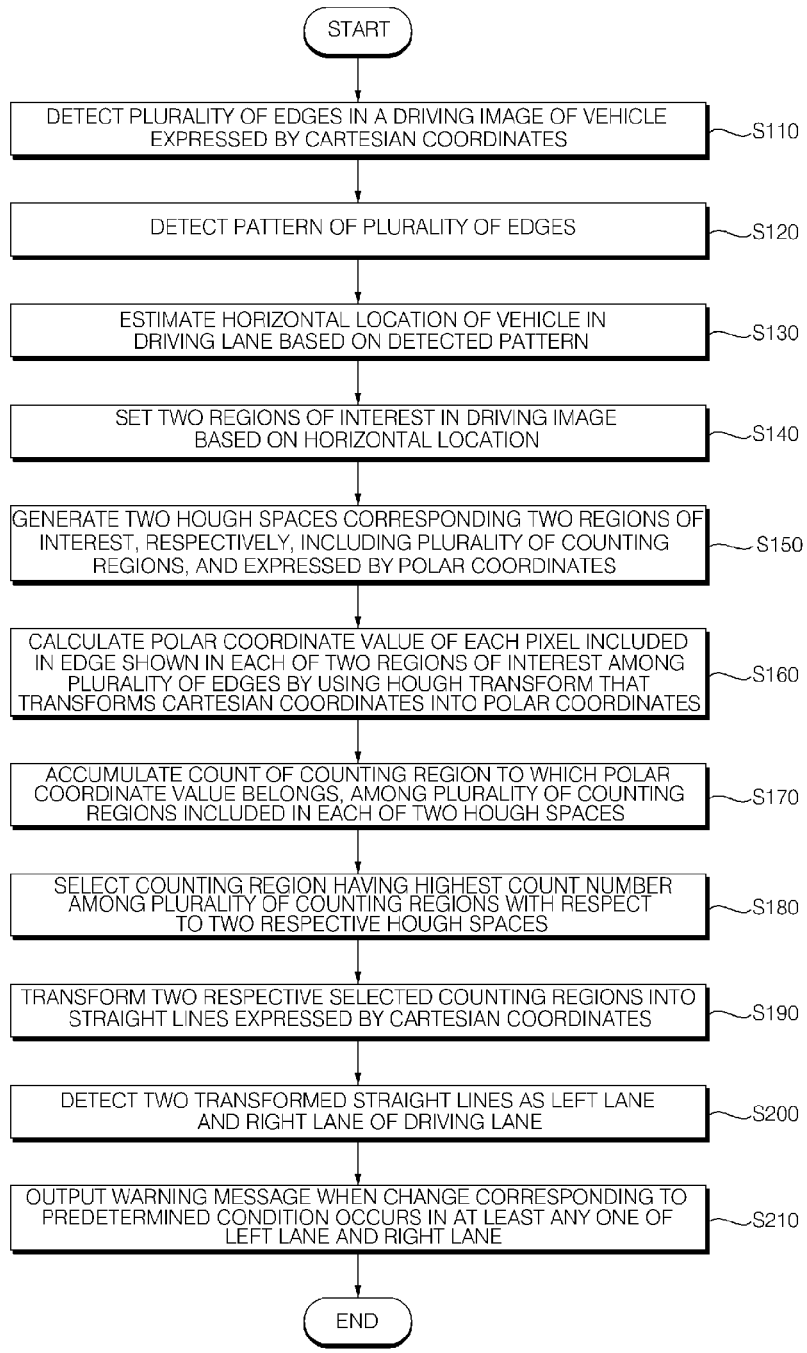
FIG. 6 is a flow chart illustrating an operating method for a lane detection apparatus according to the present invention.

FIG. 6 is a flow chart illustrating an operating method for a lane detection apparatus according to the present invention.

Referring to FIG. 6, the lane detection apparatus detects a plurality of edges in a driving image of a vehicle (S110). In detail, in step S110, the lane detection apparatus may receive a driving image from a camera unit 110 of the vehicle, transforms the received driving image into a gray image, and detect a plurality of edges based on brightness values of pixels included in the gray image. For example, pixels of a region in which a brightness change amount of a reference value or more in the gray image are connected to detect the plurality of edges.

Next, a pattern of the plurality of edges is detected (S120). For example, a vehicle location estimating unit 142 may detect the pattern based on slopes of the plurality of edges detected by an edge detecting unit 130. In this case, the vehicle location estimating unit 142 may calculate an average value of slopes shown at a left side and an average value of slopes of edges shown at a right side based on a central vertical axis of the gray image, and detect the pattern of the plurality of edges based on both calculated slope average values.

Next, a horizontal location of the vehicle in a driving lane is estimated based on the pattern detected in step S120 (S130). For example, when a bilaterally symmetric pattern is detected in step S120, the lane detection apparatus may estimate that the horizontal location of the vehicle is a first location which is the center of the driving lane. Alternatively, the lane detection apparatus may estimate which side of the left side, the right side, and the center of the driving lane the vehicle is closer to, based on an image vanishing point shown in the driving image and a horizontal line passing through the image vanishing point. For example, the horizontal location of the vehicle may be estimated as any one of the first location corresponding to the center of the driving lane, a second location corresponding to the left side of the driving lane, and a third location corresponding to the right side of the driving lane.

Next, two regions of interest are set in the driving image based on the estimated horizontal location (S140). Herein, the region of interest may mean a region which becomes a target for detecting a left lane and a right lane constituting the driving lane among the plurality of detected edges. Further, an interest region setting unit 144 may decide the sizes or locations of the respective regions of interest based on an installation angle or an image angle of the camera unit 110 photographing the driving image.

Next, two Hough spaces are generated, which correspond to two regions of interest set in step S140, respectively (S150). In this case, each of two Hough spaces may include a plurality of counting regions and be expressed by polar coordinates. For example, a first Hough space corresponding to a first region of interest and a second Hough space corresponding to a second region of interest may be generated.

Next, a polar coordinate value of each pixel included in the edge shown in each of two regions of interest among the plurality of edges is calculated by using Hough transform that transforms Cartesian coordinates into the polar coordinates.

Next, a count of counting regions to which the polar coordinate values calculated in step S160 belong is accumulated among the plurality of counting regions included in two respective Hough spaces (S170).

Next, a counting region having the highest count number is selected among the plurality of counting regions with respect to two respective Hough spaces (S180). For example, when the first Hough space and the second Hough space are generated, a counting region having the highest count number may be selected among the plurality of counting regions included in the first Hough space and a counting region having the highest count number may be selected among the plurality of counting regions included in the second Hough space.

Next, two respective selected counting regions having the highest count number are transformed into the straight lines expressed by the Cartesian coordinates (S190). The counting region selected in the first Hough space may be transformed into one straight line expressed by the Cartesian coordinates and the counting region selected in the second Hough space may be transformed into another straight line expressed by the Cartesian coordinates. That is, two straight lines may be acquired through step S190. Meanwhile, step S190 may be performed only when the count number of the counting region selected in step S180 is equal to or more than a predetermined reference value. This is to improve reliability of a lane detection result. Next, two transformed straight lines are detected as the left lane and the right lane of the driving lane (S200).

In this case, the lane detection apparatus may calculate a distance between the left lane and the right lane detected through step S200 and determine whether the calculated distance between the left lane and the right lane is within a predetermined reference range. When it is determined that the distance between the left lane and the right lane deviates from the predetermined reference range, the number of the counting regions included in two respective Hough spaces may increase or the size of each counting region itself may be extended. Herein, increasing the number of the counting regions may mean extending the sizes of two respective Hough spaces. In detail, that the distance between the left lane and the right lane detected through step S200 deviates from the predetermined reference range may mean that there is a high possibility that information on an actual lane will not be included in a current Hough space. Therefore, the size of the Hough space is extended to allow the information on the actual lane to be included in the extended Hough space.

On the contrary, when the distance between the left lane and the right lane detected through step S200 deviates from the predetermined reference range, the Hough transformation unit 140 may decrease the number of the counting regions included in each current Hough space. Herein, decreasing the number of the counting regions may mean decreasing the sizes of two respective Hough spaces. In detail, that the distance between the left lane and the right lane detected through step S200 is within the predetermined reference range may mean that there is a high possibility that the information on the actual lane will not be included in the current Hough space. Therefore, the size of the Hough space is decreased to decrease the number of counting regions of which the count number should be accumulated and calculated, thereby improving a lane detection speed.

Meanwhile, the lane detection apparatus may output a warning message when a change corresponding to a predetermined condition occurs in at least any one of the left lane and the right lane detected in step S200 (S210). For example, when the length of at least any one of the left lane and the right lane detected in step S200 rapidly decreases to a predetermined change amount or more, it is determined that the vehicle overlaps with the left lane or the right lane to output a visual or auditory warning message.

Unless explicitly described otherwise, a term "including", "comprising", or "having" disclosed hereinabove any components will be understood to imply the inclusion of other components but not the exclusion but further inclusion of any other components.

While the exemplary embodiments of the present invention have been illustrated and described above, the present invention is not limited to the aforementioned specific exemplary embodiments, various modifications may be made by a person with ordinary skill in the art to which the present invention pertains without departing from the subject matters of the present invention that are claimed in the claims, and these modifications should not be appreciated individually from the technical spirit or prospect of the present invention.

What is claimed is:

1. An operating method of a lane detection apparatus comprising:
   detecting, by the lane detection apparatus, a plurality of edges in a driving image of a vehicle translated into Cartesian coordinates;
   detecting, by the lane detection apparatus, a pattern of the plurality of edges in the driving image of the vehicle;
   estimating, by the lane detection apparatus, a horizontal location of the vehicle in a driving lane based on the detected pattern of the plurality of edges;
   setting, by the lane detection apparatus, two regions of interest in the driving image based on the horizontal location, the two regions of interest comprising a first region of interest and a second region of interest;

generating, by the lane detection apparatus, a first Hough space and a second Hough space corresponding to the first region of interest and the second region of interest, respectively, the first Hough space and the second Hough space each comprising a plurality of counting regions, wherein a portion of edges in the driving image of the vehicle is shown in each of the first region of interest and the second region of interest;

calculating, by the lane detection apparatus, a polar coordinate value of each pixel included in an edge of the plurality of edges in the driving image shown in each of the first region of interest and the second region of interest by using a Hough transform that transforms Cartesian coordinates into polar coordinates;

accumulating, by the lane detection apparatus, a count number of a counting region to which the polar coordinate value belongs, with respect to each of the first Hough space and the second Hough space;

selecting, by the lane detection apparatus, a first counting region having the highest count number among the plurality of counting regions with respect to a first Hough space and selecting a second counting region having the highest count number among the plurality of counting regions with respect to a second Hough space;

transforming, by the lane detection apparatus, the first counting region and the second counting region into a first straight line and a second straight line expressed by the Cartesian coordinates, the first straight line with respect to the first Hough space and the second straight line with respect to the second Hough space;

detecting, by the lane detection apparatus, the first straight line as a left lane and detecting the second straight line as a right lane of the driving lane;

calculating, by the lane detection apparatus, a distance between the left lane and the right lane;

determining, by the lane detection apparatus, whether the distance between the left lane and the right lane is within a predetermined reference range; and increasing, by the lane detection apparatus, a number of the first counting region in the first Hough space or a number of the second counting region in the second Hough space when it is determined that the distance between the left lane and the right lane deviates from the predetermined reference range to output a warning message by the lane detection apparatus based at least on the determination.

2. The method of claim 1, wherein the detecting of the plurality of edges in the driving image of the vehicle includes:
receiving the driving image from a camera of the vehicle;
transforming the driving image into a gray image; and
detecting the plurality of edges based on brightness values of pixels included in the gray image.

3. The method of claim 2, wherein in the detecting of the plurality of edges, pixels of a region in which a brightness value changes by an amount greater than a reference value in the gray image are connected to detect the plurality of edges.

4. The method of claim 1, wherein the horizontal location is estimated as one of a first location corresponding to the center of the driving lane, a second location corresponding to a left side of the driving lane, and a third location corresponding to a right side of the driving lane.

5. The method of claim 1, wherein the first region of interest is positioned at a left side and the second region of interest is positioned at a right side based on a vertical axis in a center of the driving image.

6. The method of claim 5, wherein in the generating of the first Hough space and the second Hough space, the first Hough space encompasses the first region of interest and the second Hough space encompasses the second region of interest.

7. The method of claim 1, wherein in the setting of the two regions of interest in the driving image, the size or location of the two regions of interest is decided based on an installation angle and an image angle of the camera photographing the driving image.

8. The method of claim 1, wherein the transformation of the first counting region and the second counting region into the first straight line and the second straight line expressed by the Cartesian coordinates is performed when a count number of the selected counting region is equal to or more than a predetermined reference value.

9. The method of claim 1, further comprising:
outputting the warning message when at least one of the left lane and the right lane changes by a predetermined amount.

* * * * *